J. W. HARKOM.
TAP AND VALVE.
APPLICATION FILED MAY 15, 1911.

1,070,803.

Patented Aug. 19, 1913.

Witnesses.

Inventor.
J. W. HARKOM.

UNITED STATES PATENT OFFICE.

JOHN WILLIAM HARKOM, OF MELBOURNE, QUEBEC, CANADA.

TAP AND VALVE.

1,070,803.     Specification of Letters Patent.     Patented Aug. 19, 1913.

Application filed May 15, 1911. Serial No. 627,187.

*To all whom it may concern:*

Be it known that I, JOHN WILLIAM HARKOM, of the village of Melbourne, in the county of Richmond, in the Province of Quebec, Canada, have invented certain new and useful Improvements in Taps and Valves, of which the following is the specification.

My invention relates to improvements in taps and valves, and the object of the invention is to devise a valve proper adaptable to any form of ordinary valve or tap in which a yielding resilient circular diaphragm having a stem is used, which will not be subject to the defects of ordinary valves of this character in that it is not liable to distortion on its seat through pressure of the stem thereon, or the stem frequently gripping the valve and consequently abrading, wearing or tearing the same at the point of contact or on the seat as hereinafter more particularly explained.

My invention consists of a valve comprising a circular diaphragm preferably of rubber held between the top edge of the upwardly projecting sleeve of the casing and the screw cap and provided with a central cylindrical portion and a central core against which the bottom end of the screw spindle abuts, and a circumferential casing surrounding the depending portion of the valve as hereinafter more particularly explained.

Figure 1:
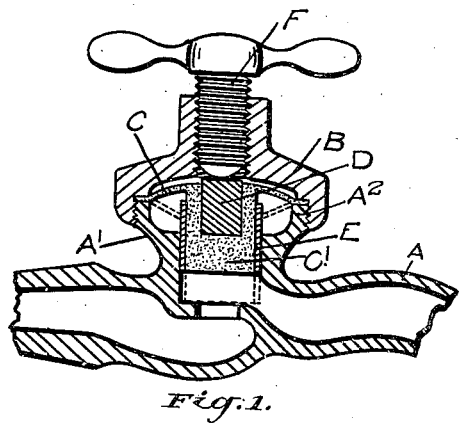
Figure 2:
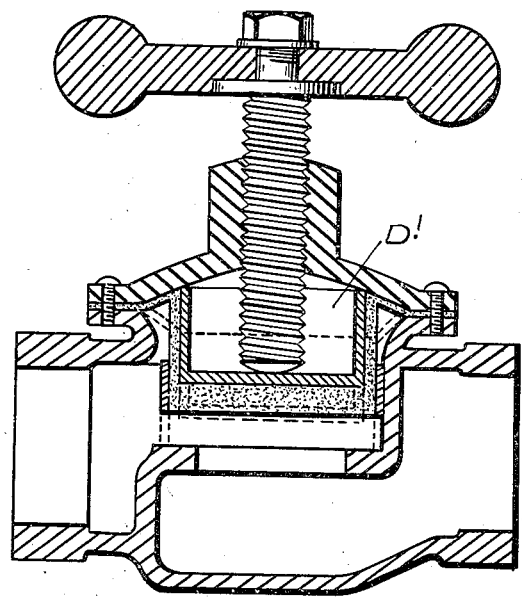
Figure 3:
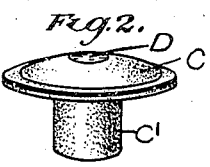

Figure 1, is a view of a tap provided with my improvement. Fig. 2, is a view of a valve showing an alternative form of my device. Fig. 3, is a perspective detail of the valve shown in Fig. 1.

In the drawings like letters of reference indicate corresponding parts in each figure.

A is a tap having an upwardly extending sleeve A′ screw-threaded on the outer side at A² as indicated.

B is a screw cap.

C is a disk or circular diaphragm of yielding resilient material preferably rubber, which is dished or concavo-convex in form and is provided with a depending cylindrical plug portion C′. The valve proper is made of resilient material to cause the valve to automatically unseat itself when the seating means is withdrawn.

D is a metal core, which extends into the top of the cylindrical portion of the valve.

E is a cylindrical metal casing surrounding the cylindrical plug, such casing being made of metal or hard material.

F is a screw spindle, which extends through the screw cap and has the inner end abutting the metal core D.

In Fig. 2, I show a form of globe valve in which the core D′ is made hollow or cup-shape. It is, of course, important that the core as well as the casing be made of a material, such as metal, which is comparatively hard as compared with the main body of the valve proper, which may be made of rubber of a softness corresponding to what the ordinary type of rubber washer or plug used in like cases is made of. It will be seen from this description that the metal core in the valve proper prevents any abrasion or bruising or wearing of the valve at this point and that the cylindrical casing surrounding the valve also prevents wear and tearing and spreading of the valve at the point of contact with the seat.

By such a valve as I describe I am enabled to increase the life of the valve to a maximum extent.

What I claim as my invention is:

The combination with a valve casing having a centrally disposed bridge between the inlet and the outlet provided with an orifice and a laterally extending sleeve provided with a central orifice, and a cup-shaped enlargement, and a cap for the valve casing provided with an orifice, of a valve comprising a dished disk held at its edge between the cap and the outer edge of the sleeve and having a depending portion fitting the central orifice of the sleeve and adapted to seat on said bridge to close the orifice therethrough and being formed of resilient unstretchable material capable only of flexing to automatically withdraw said depending portion from its seat, and a valve seating means comprising a stem extending through the orifice in the cap and abutting at its inner end the outer end of the valve, so as by inward pressure to flex the dished disk inwardly into the cup-shaped recess and to seat the said depending portion as specified.

JOHN WILLIAM HARKOM.

Witnesses:
B. BOYD,
H. PRESTON.